No. 850,457. PATENTED APR. 16, 1907.
J. C. ANDERSON.
PROPORTIONAL METER.
APPLICATION FILED JUNE 15, 1903. RENEWED MAR. 22, 1907.
2 SHEETS—SHEET 1.
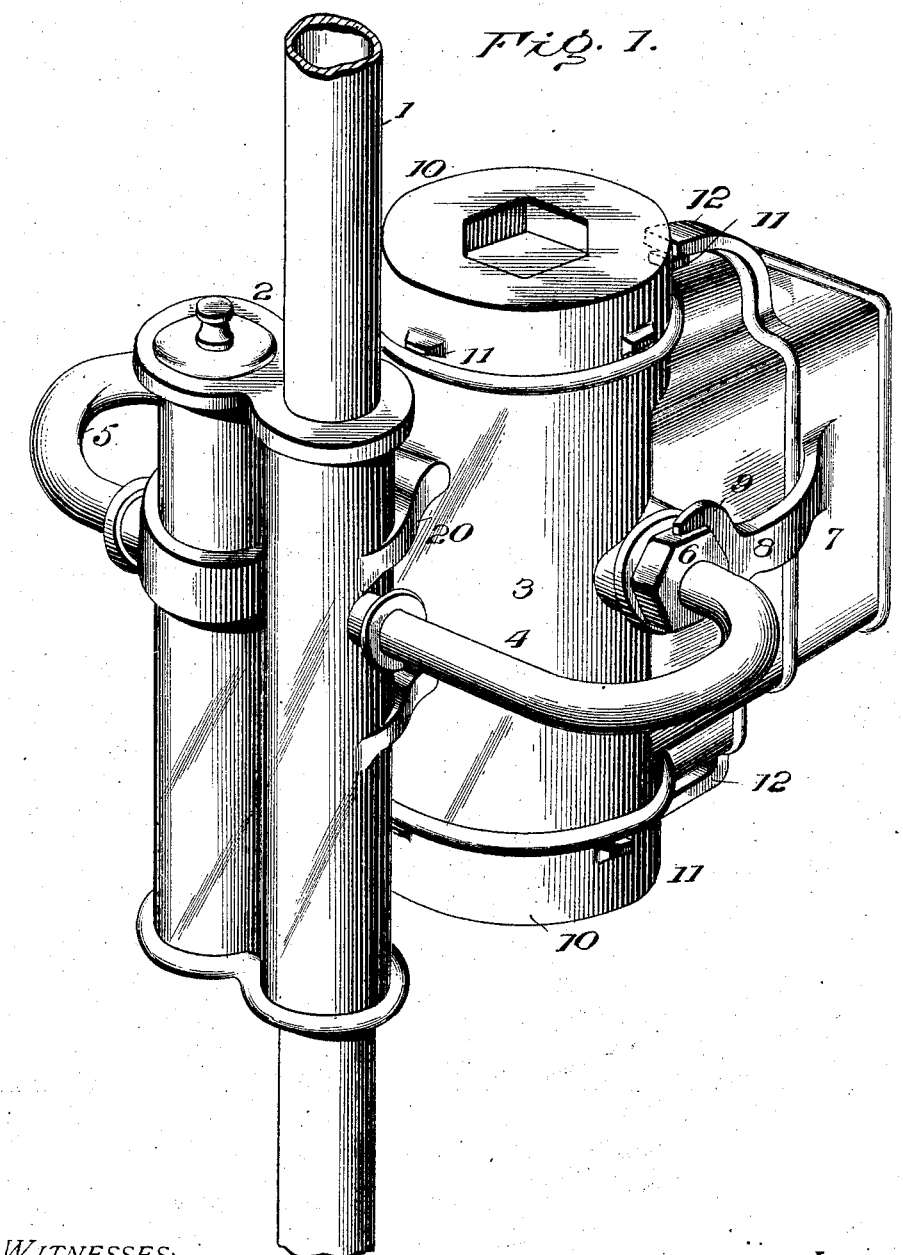

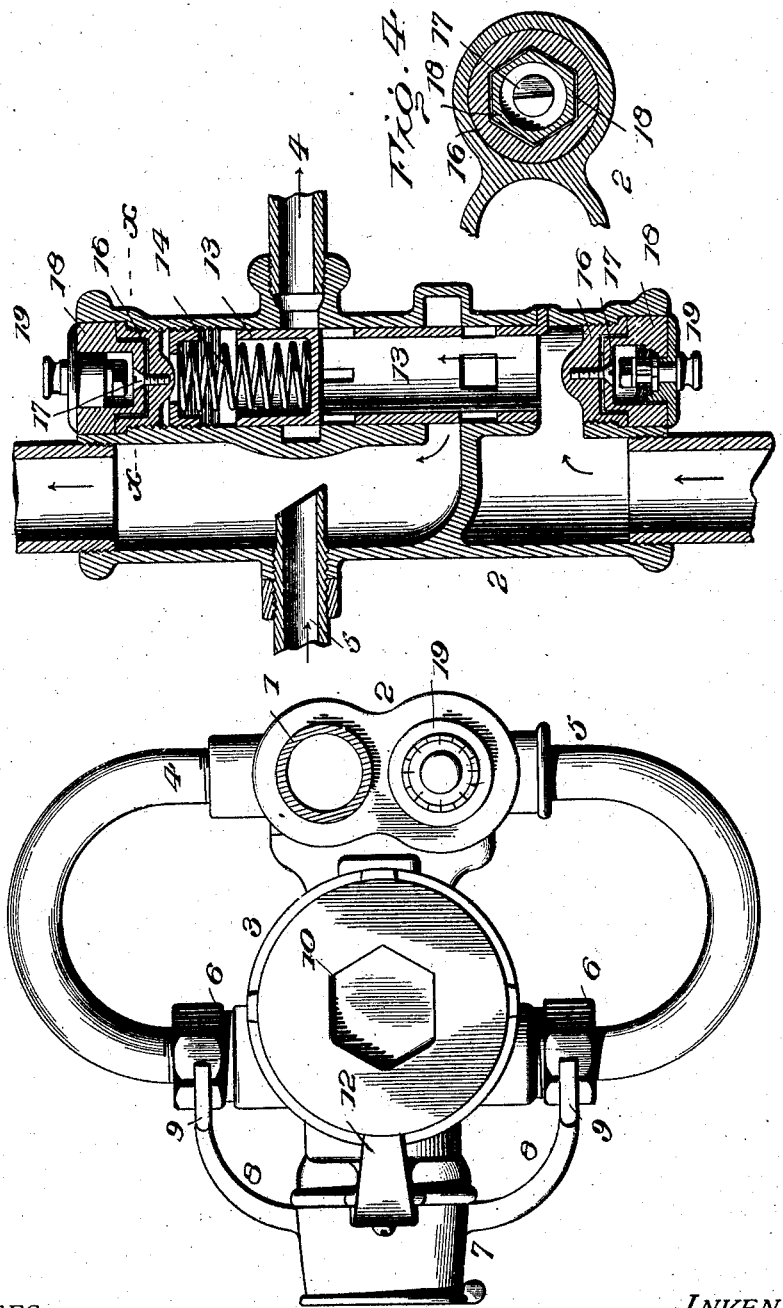

UNITED STATES PATENT OFFICE.

JAMES C. ANDERSON, OF HIGHLAND PARK, ILLINOIS.

PROPORTIONAL METER.

No. 850,457.

Specification of Letters Patent.

Patented April 16, 1907.

Application filed June 15, 1903. Renewed March 22, 1907. Serial No. 363,957.

*To all whom it may concern:*

Be it known that I, JAMES C. ANDERSON, a citizen of the United States, residing at Highland Park, in the county of Lake and State of Illinois, have invented certain new and useful Improvements in Proportional Meters; and I do hereby declare the following to be a full, clear, and exact description of the invention, such as will enable others skilled in the art to which it appertains to make and use the same.

My invention relates to certain new and useful improvements in water-meters, and while especially adapted to a proportional meter, such as illustrated and described in an application filed concurrently herewith and bearing Serial No. 161,564, may be in part employed in connection with a meter such as is shown and described in Letters Patent No. 711,192, granted to me on the 14th of October, 1902.

My present invention has for its object to not only guard against any fraudulent alteration of the controller or valve employed in the construction shown in my above-referred-to application, but to also guard against the reversal of the connection between such a meter as that shown in my Letters Patent referred to or any other meter with the supply pipe or main and to thus prevent the reversal of the registering mechanism of the meter.

In the drawings forming part of this application, and which are duplicates of those accompanying the concurrent application referred to, Figure 1 represents in perspective a meter and proportional coupling connected with an ordinary main or supply pipe, the meter being of such construction as that shown and described in the Letters Patent granted to me, as hereinbefore stated. Fig. 2 is a central vertical section of the auxiliary passage or coupling shown and described in the concurrent application hereinbefore referred to. Fig. 3 is a top or plan view of the relation of the parts as shown in perspective at Fig. 1, and Fig. 4 is a detail section taken on the line $x\,x$ of Fig. 2.

Similar numerals represent like parts in the several figures.

1 represents an ordinary main or conduit pipe, 2 a coupling such as described in my concurrent application for proportionately dividing the main body of water delivered by the main or conduit, and 3 a meter such as described in my Letters Patent hereinbefore referred to.

4 represents an ordinary conduit or a pipe leading from the coupling 2 or a main supply-pipe, as the case may be, and communicating with a meter 3, and 5 is a pipe connected with the opposite side of the meter and leading back to the coupling 2 or main. In either case the pipes 4 and 5 are secured to the meter by polygonal coupling-nuts 6, and the cap 7, which protects and guards the registering mechanism of the meter, is locked in position in the manner described in Letters Patent No. 711,191, granted to me October 14, 1902. The cap 7 has formed integral therewith yokes or arms 8, the ends of which terminate in forks 9, adapted to embrace the polygonal nuts 6, as clearly shown at Figs. 1 and 3, so that when the parts are properly assembled and the cap 7 is securely locked in position by the locking devices described in my Letters Patent No. 711,191 the coupling-nuts 6 cannot be removed, and hence the established relation between the meter and the main or conduit or the coupling 2, as the case may be, cannot be altered, and hence the action of the meter cannot be reversed, as might be the case if no other means for preventing such action be not provided.

When my present invention is employed in connection with the coupling 2, such as described in my concurrent application, it will be readily seen that when the pipes 4 and 5 have been connected to the coupling 2 by an ordinary screw-joint and their opposite ends have been connected with the meter 3 by the coupling-nuts 6 the relation between the meter and the coupling has become fixed and cannot be fraudulently altered.

10 are the heads of the meter secured to the cylinder by a screw-thread, as fully described in my patent hereinbefore referred to, and to prevent any fraudulent removal of said caps I provide the same with one or more radial lugs 11 and the cap 7 of the registering mechanism with arms 12, which, as shown at Fig. 1, have their free ends located outside of the lugs 11 a sufficient distance to permit of the necessary rotation of the heads to tighten the same when necessary; but when an effort be made to remove the head 10 it will be seen that the lug or lugs 11 will, according to the distance the cap is moved, be brought into coincidence with the plane of the extremity of the arm 12, and consequently the lug will contact with said arm and continued rotation of the head will be impossible, and hence access to the interior of the meter is prevented and no false adjustments can be made.

When the meter is used in connection with the novel coupling 2, such as described in my concurrent application hereinbefore referred to, I provide that portion of the coupling which constitutes the secondary water-passage therein, and in which is located the controller or piston valve 13, the spring 14, and adjusting ring-nut 15, with a threaded bushing 16 at each end of the secondary passage or water-channel, and to this bushing I secure by a screw 17 the stationary portion 18 of such a locking mechanism as that described and illustrated in my Letters Patent No. 711,191, heretofore referred to, so that when the part 19 of the lock is turned into locking position access to the valve or controller and its adjusting devices is prevented, and consequently the adjustment of the controller cannot be altered to fraudulently change the proportional division of the column of water flowing through the main to cause a fraudulent registration by the meter.

As fully described in my concurrent application hereinbefore referred to, the locking devices at each end of the coupling 2 also permit of the ready machining of the passage in which the controller and its adjusting devices are located and the ready assembling and adjustment of the same.

From the construction and arrangement shown and described it will be readily seen that after a meter has been properly located to accurately register the quantity of water passed through the main and used by a consumer no alterations can be made except by a person having possession of the combination or key of the locking devices of the cap of the register or the locking devices at each end of the passage in which the controller is located.

Having described the construction and advantages of my improvements, what I claim as new, and desire to secure by Letters Patent, is—

1. In combination with a meter-cylinder closed by heads adapted to be secured in position by a threaded connection with the cylinder and provided with radial lugs or projections, a cover or cap locked in position to protect and guard the registering devices and provided with a fixed arm extending within the rotative plane of the lugs or projections on the heads of the cylinder and adapted to contact therewith, whereby fraudulent removal of the heads is prevented, as hereinbefore set forth.

2. In combination with the meter and registering mechanism, and inlet and outlet pipes connected with the meter by polygonal couplings; a cap or cover locked in position over the registering mechanism and formed with rigid integral yokes terminating in forks adapted to embrace the polygonal couplings, whereby both the registering mechanism and the polygonal couplings are protected against fraudulent manipulation substantially as hereinbefore set forth.

3. In a meter provided with a coupling intermediate of the main supply-pipe and the meter and formed with a passage for, and provided with a controller-valve for proportionately dividing the column of water delivered through the main supply-pipe; a threaded bushing secured in position at the end of the valve-seat; a lock member secured to the threaded bushing by a screw, and a second lock member located within the lock member attached to the bushing and adapted to be locked to the first-named lock member, substantially as and for the purpose set forth.

In testimony whereof I affix my signature in presence of two witnesses.

JAMES C. ANDERSON.

Witnesses:
D. G. STUART,
JNO. J. HARROWER.